(12) United States Patent
Lan

(10) Patent No.: US 6,717,703 B2
(45) Date of Patent: Apr. 6, 2004

(54) GUIDE SCREW ROD FOR A SCANNER

(75) Inventor: Chia-Tsui Lan, Tao-Yuan Hsien (TW)

(73) Assignee: Primax Electronics Ltd., Taipei (TW)

( * ) Notice: Subject to any disclaimer, the term of this patent is extended or adjusted under 35 U.S.C. 154(b) by 488 days.

(21) Appl. No.: 09/880,775

(22) Filed: Jun. 15, 2001

(65) Prior Publication Data

US 2002/0001106 A1 Jan. 3, 2002

(30) Foreign Application Priority Data

Jun. 30, 2000 (TW) ...................................... 89211242 U

(51) Int. Cl.[7] .................................................. H04N 1/04
(52) U.S. Cl. ........................ 358/497; 358/474; 358/483; 250/208.1
(58) Field of Search ................................. 358/497, 474, 358/483, 471, 400, 500, 506, 487, 509, 514, 512, 513; 382/312, 318, 319; 399/211; 250/208.1, 234–236; 318/685, 696

(56) References Cited

U.S. PATENT DOCUMENTS

| 4,672,219 | A | * | 6/1987 | Iwabuchi et al. | ......... 250/208.1 |
| 5,235,353 | A | * | 8/1993 | Hirano et al. | ............... 340/145 |
| 5,845,180 | A | * | 12/1998 | Tsai | ............................ 399/211 |
| 6,246,492 | B1 | * | 6/2001 | Chang et al. | ............... 358/497 |
| 6,330,084 | B1 | * | 12/2001 | Chiang | ........................ 358/497 |
| 6,626,360 | B2 | * | 9/2003 | Huang | ........................ 235/454 |

FOREIGN PATENT DOCUMENTS

TW    341418    9/1998

* cited by examiner

Primary Examiner—Cheukfan Lee
(74) Attorney, Agent, or Firm—Winston Hsu

(57) ABSTRACT

A scanning device includes a guide screw rod with a motor and a gear device as parts of the scanning module. The guide screw rod is fixed in the scanner along a front-to-back direction. The motor drives the gear device, which engages with the guide screw rod, causing the scanning module to move back and forth to scan a document.

5 Claims, 5 Drawing Sheets

GUIDE SCREW ROD FOR A SCANNER

BACKGROUND OF THE INVENTION

1. Field of the Invention

The present invention relates to a scanner, and more particularly, to a scanner with a guide screw rod.

2. Description of the Prior Art

With improvements in both software and hardware, scanners have begun to play an important role in importing images. Amongst the various types of scanners, desktop scanners are the most common. In a desktop scanner, a scanning module is set under a transparent surface, and moves back and forth to scan the document on the transparent surface. The scanning module does not move under its own power. Instead, a driving mechanism, such as belts or steel strings set on a plurality of wheels, is used to maintain the horizontal balance of the scanning module, to fix the direction of scanning, and to drive the scanning module back and forth. The structures of these driving mechanisms are usually complicated, making both manufacturing and maintenance of the scanner inconvenient and time-consuming. Usually, the the driving belts or steel strings can not keep the scanning module steady along a fixed path. Moreover, the driving mechanism must be driven by a motor to drive the scanning module. The power dissipation is thus large.

SUMMARY OF THE INVENTION

It is therefore an object of the present invention to provide a scanner that comprises a guide screw rod to simplify the structure of the driving mechanism. The scanning module is driven by a motor to move back and forth along the guide screw rod. The power dissipation is reduced by this arrangement.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Figure 1:
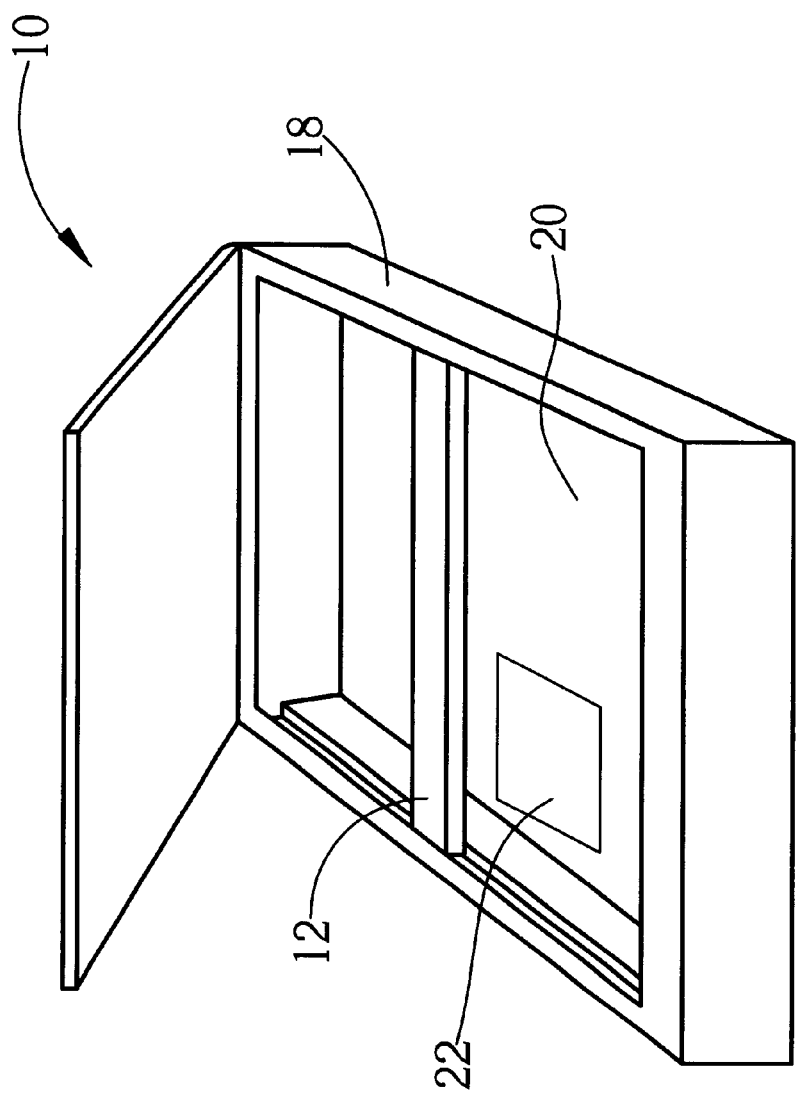
FIG. 1 is a perspective view of a scanner of the present invention.
Figure 2:
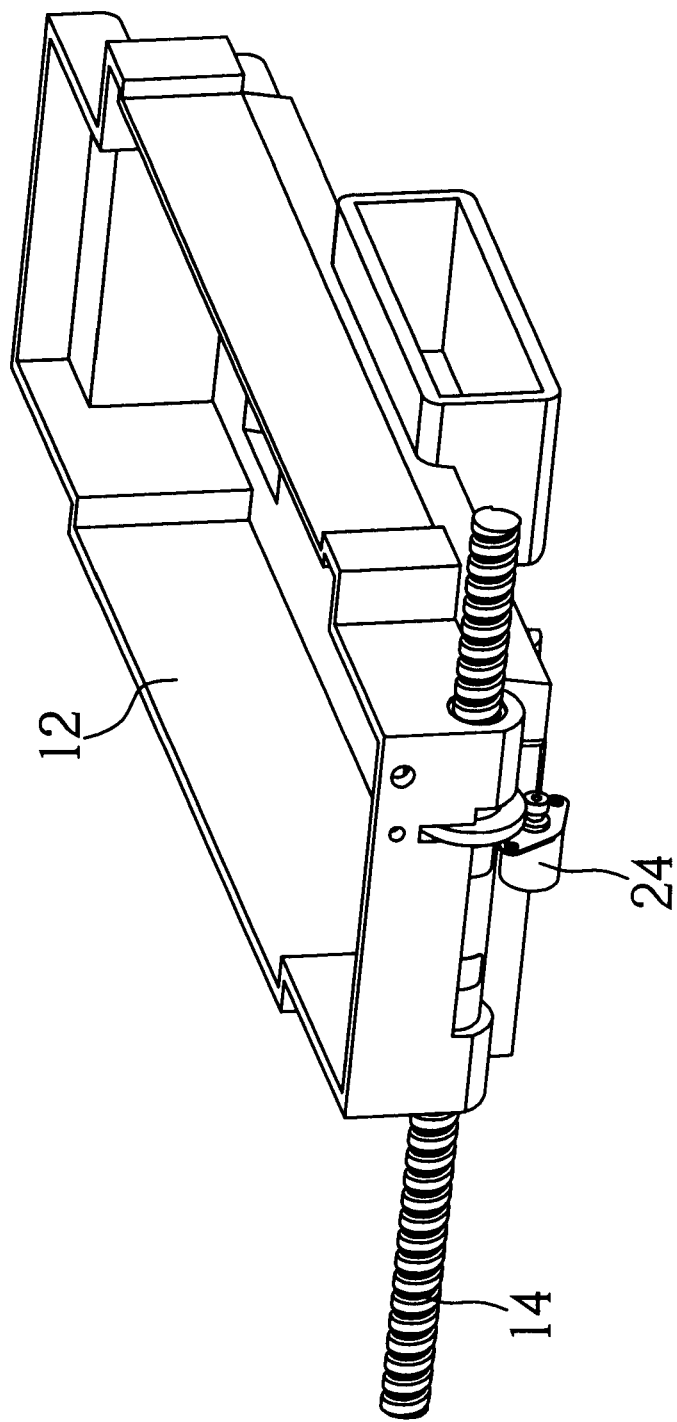
FIG. 2 is a perspective view of a scanning module of the scanner in FIG. 1 connected to a guide screw rod.
Figure 3:
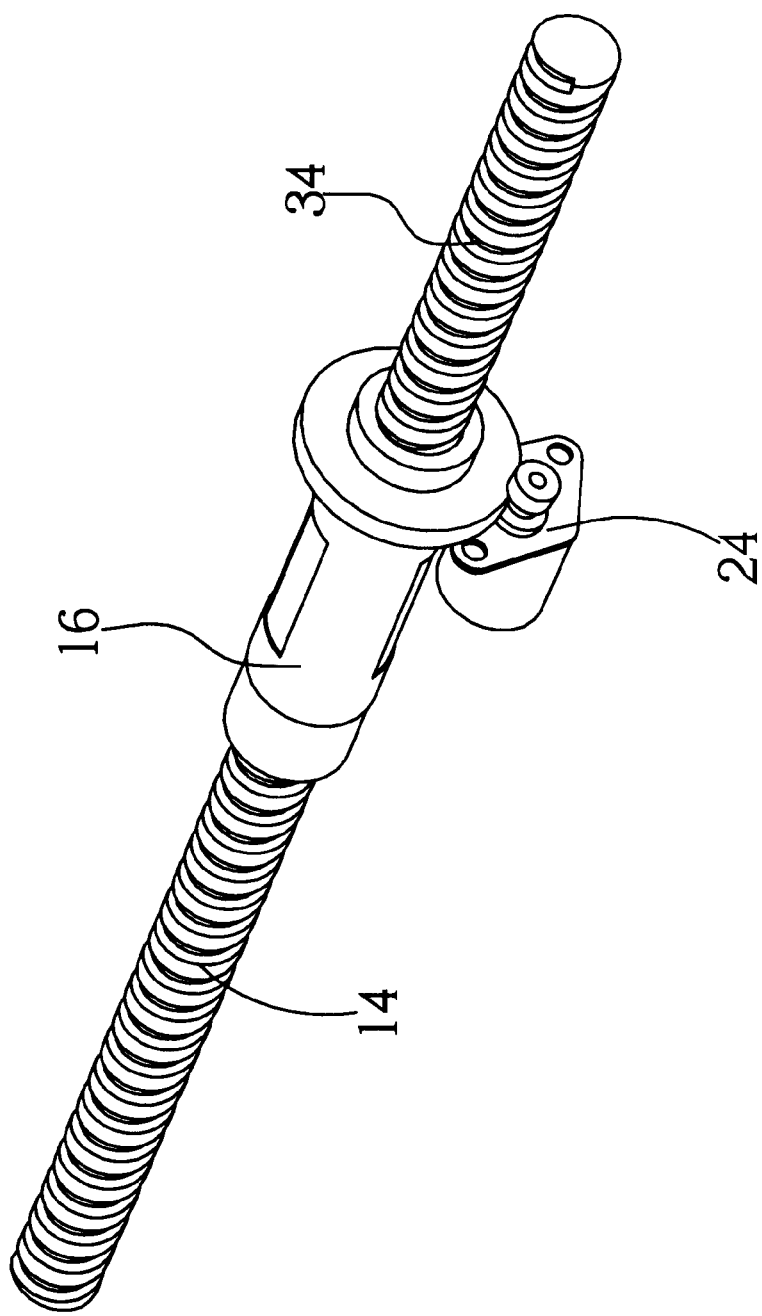
FIG. 3 is a perspective view of a gear device in the scanner of FIG. 1 connected to a guide screw rod.

Please refer to FIG. 1 and FIG. 3. FIG. 1 is a perspective view of a scanner 10 of the present invention. FIG. 2 is a perspective view of a scanning module 12 in the scanner 10 connected to a guide screw rod 14 in the scanner 10. FIG. 3 is a perspective view of a gear device 16 in the scanner 10 connected to the guide screw rod 14.

The scanner 10 comprises a housing 18, a transparent surface 20 onto which is placed a document 22 for scanning, a guide screw rod 14 fixed in the housing 18 along a front-to-back direction, a scanning module 12 set on the guide screw rod 14 to scan the document 22 by moving back and forth along the guide screw rod 14, a gear device 16 set on the guide screw rod 14, and a motor 24 on a side of the gear device 16 to drive the gear device 16 and move with the gear device 16.

Figure 4:
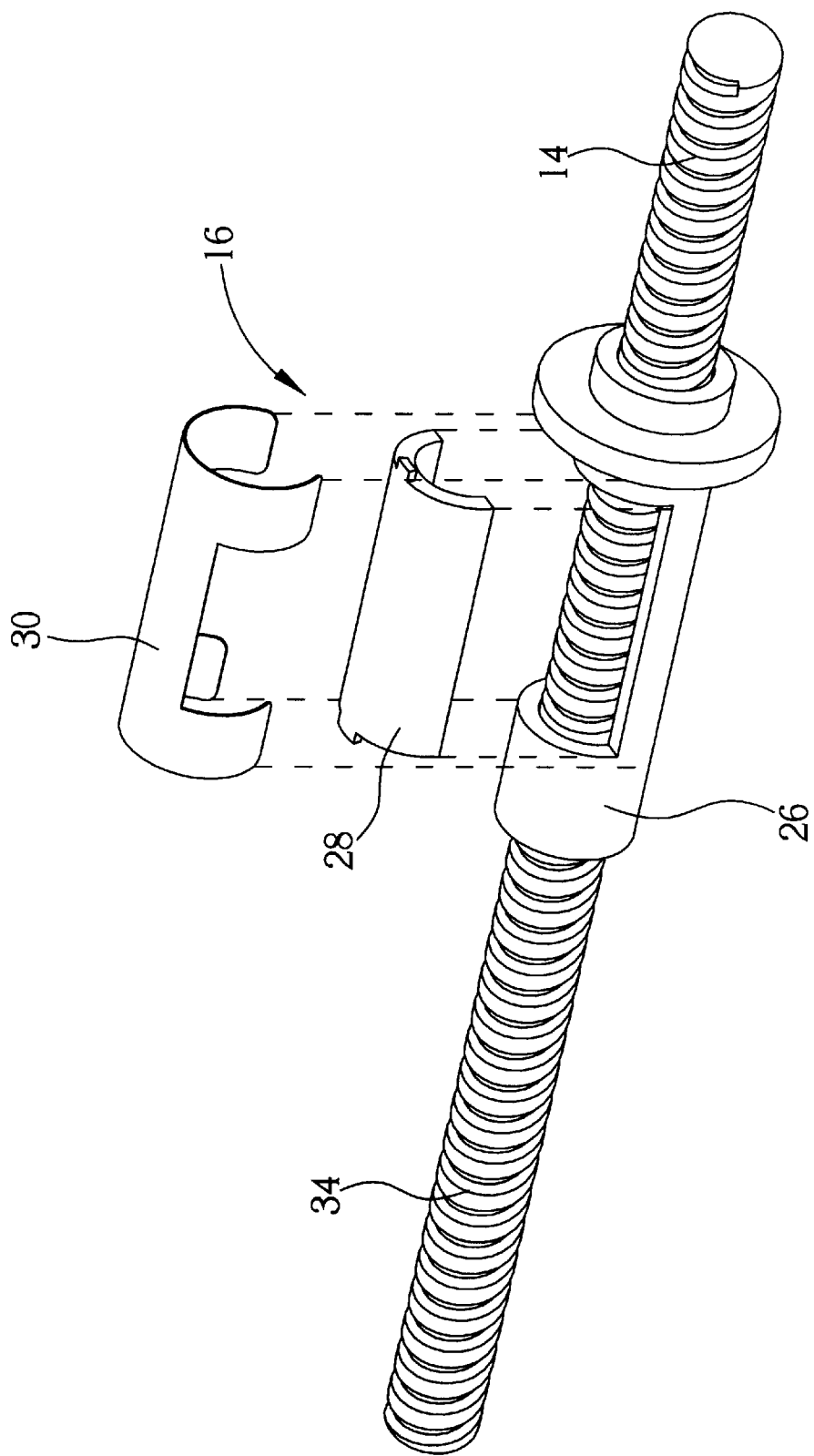
FIG. 4 is an exploded view of the components of the gear device in FIG. 3.
Figure 5:
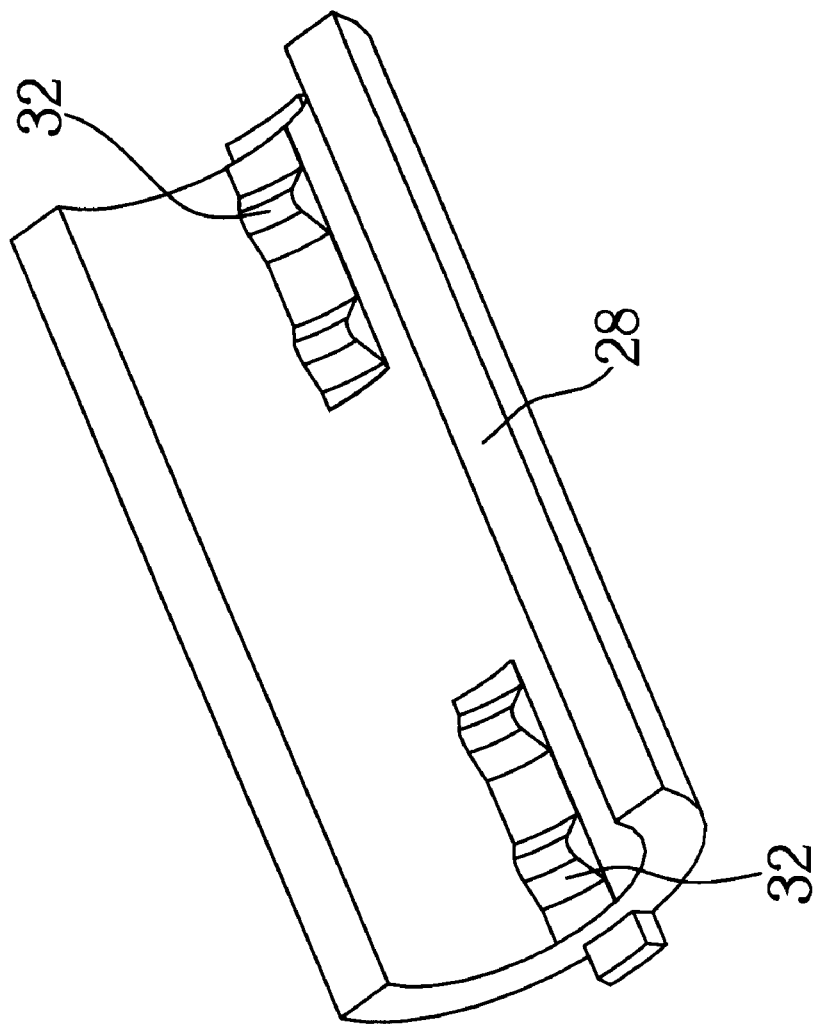
FIG. 5 is a perspective view of a gear gland in the gear device of FIG. 4.

Please refer to FIG. 4 and FIG. 5. FIG. 4 is an exploded view of the components of the gear device 16, and FIG. 5 is a perspective view of a gear gland 28 of the gear device 16. The gear device 16 comprises a gear element 26, a gear gland 28 and a gear bushing 30 that connects the gear element 16 and the gear gland 28 to the guide screw rod 14. A screw thread 34 is on the surface of the guide screw rod 14. Two teeth 32 on the inner surface of the gear gland 28 engage with the screw thread 34 on the guide screw rod 14, and the motor 24 engages with the gear element 26 to drive the gear device 16.

When the motor 24 drives the gear device 16, the teeth 32 on the inner surface of the gear gland 28 move along the screw thread 34 on the guide screw rod 14 to drive the gear device 16 back and forth. The gear device 16 thus drives the scanning module 12 along the guide screw rod 14 so that the scanning module 12 can move back and forth in the housing 18 to scan the document 22.

In the preferred embodiment, the two teeth 32 in the gear gland 28 can be replaced by a single tooth, a plurality of teeth, or even a screw thread corresponding to the screw thread 34 on the surface of the guide screw rod 14. In addition, the guide screw rod 14, the gear device 16 and the motor 24 can be located not only at one end of the scanning module 12, as shown in FIG. 2. The guide screw rod 14, the gear device 16 and the motor 24 can also be set in the center or other regions of the scanning module 12, and would conform to the spirit of the present invention so long as they drive the scanning module 12 back and forth.

In comparison with the prior art scanner, the scanning module 12 of the scanner 10 of the present invention moves along the guide screw rod 14. Therefore the scanning module 12 has a more steady movement in the housing 18. The motor 24 drives the gear device 16, and not the guide screw rod 14, so the power requirements of the motor 24 are reduced.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A scanner comprising:

a housing with a transparent surface on a top of the housing, a document being placed on the transparent surface for scanning;

a guide screw rod set in the housing along a front-to-back direction, the guide screw rod having a screw thread on its surface;

a scanning module set on the guide screw rod, the scanning module moving forward and backward along the guide screw rod to scan the document;

a gear device set on the guide screw rod, the gear device having at least one tooth to engage with the screw thread on the guide screw rod;

a motor on a side of the gear device, the motor moving with the gear device to drive the gear device back and forth;

wherein when the motor drives the gear device, the teeth of the gear device move along the screw thread on the guide screw rod so as to drive the gear device back and forth along the guide screw rod, and therefore the scanning module in the housing is driven back and forth by the gear device to scan the document.

2. The scanner of claim 1 wherein an inner side of the gear device has a screw thread with a plurality of teeth to engage with the screw thread on the surface of the guide screw rod.

3. The scanner of claim 1 wherein the gear device comprises a gear element, a gear gland and a gear bushing to connect the gear element and the gear gland to the guide screw rod.

4. The scanner of claim 3 wherein the teeth extend out from an inner surface of the gear gland.

5. The scanner of claim 3 wherein the motor is connected to the gear element to drive the gear device.

* * * * *